United States Patent Office
3,658,929
Patented Apr. 25, 1972

3,658,929
CONVERSION OF OLEFINS
Robert L. Banks, Bartlesville, Okla, assignor to
Phillips Petroleum Company
No Drawing. Original application Apr. 3, 1967, Ser. No. 627,635. Divided and this application Nov. 16, 1970, Ser. No. 90,091
Int. Cl. C07c 3/62, 11/00, 13/00
U.S. Cl. 260—683 D                  5 Claims

ABSTRACT OF THE DISCLOSURE

Olefins are converted by contacting a mixture of at least two double bond isomers with an olefin reaction catalyst.
Olefins are pretreated by contact with magnesium oxide prior to the conversion.

---

This is a division of application Ser. No. 627,635, filed Apr. 3, 1967, now abandoned.

This invention relates to the conversion of olefin hydrocarbons by the olefin reaction.

The olefin reaction is defined as a process for the catalytic conversion over a catalyst of a feed comprising one or more ethylenically unsaturated compounds to produce a resulting product which contains at least ten percent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated hydrocarbons, and compounds which can be visualized as formed by skeletal isomerization but which cannot be visualized as formed by one or more of the above-noted reactions, comprises less than twenty-five percent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds between said first and third and between said second and fourth carbon atoms. Said first and second carbon atoms and said third and fourth carbon atoms can be in the same or different molecules.

The olefin reaction according to this invention is illustrated by the following reactions:

(1) The disproportionation of an acyclic mono- or polyene having at least three carbon atoms into other acyclic mono- or polyenes of both higher and lower number of carbon atoms; for example, the disproportionation of propylene yields ethylene and butenes; the disproportionation of 1,5-hexadiene yields ethylene and 1,5,9-decatriene;

(2) The conversion of an acyclic mono- or polyene having three or more carbon atoms and a different acyclic mono- or polyene having three or more carbon atoms to produce different acyclic olefins; for example, the conversion of propylene and isobutylene yields ethylene and isopentene;

(3) The conversion of ethylene and an internal acyclic mono- or polyene having four or more carbon atoms to produce other olefins having a lower number of carbon atoms than that of the acyclic mono- or polyenes; for example, the conversion of ethylene and 4-methylpentene-2 yields 3-methylbutene-1 and propylene;

(4) The conversion of ethylene or an acyclic mono- or polyene having three or more carbon atoms and a cyclic mono- or cyclic polyene to produce an acyclic polyene having a higher number of carbon atoms than that of any of the starting materials; for example, the conversion of cyclohexene and 2-butene yields 2,8-decadiene; the conversion of 1,5-cyclooctadiene and ethylene yields 1,5,9-decatriene;

(5) The conversion of one or more cyclic mono- or cyclic polyenes to produce a cyclic polyene having a higher number of carbon atoms than any of the starting materials; for example, the conversion of cyclopentene yields 1,6-cyclodecadiene;

(6) The conversion of an acyclic polyene having at least seven carbon atoms and having at least five carbon atoms between any two double bonds to produce acyclic and cyclic mono- and polyenes having a lower number of carbon atoms than that of the feed; for example, the conversion of 1,7-octadiene yields cyclohexene and ethylene; or (7) The conversion of one or more acyclic polyenes having at least three carbon atoms between any two double bonds to produce acyclic and cyclic mono- and polyenes generally having both a higher and lower number of carbon atoms than that of the feed material; for example, the conversion of 1,4-pentadiene yields 1,4-cyclohexadiene and ethylene.

By disproportionation as used herein is meant the conversion of hydrocarbons into similar hydrocarbons of both higher and lower numbers of carbon atoms.

An object of this invention is to convert olefins by the olefin reaction.

Another object of this invention is to disproportionate olefins by relatively high conversion rates.

Other aspects, objects and the advantages of my invention are apparent in the written description and the claims.

According to this invention, an olefin capable of undergoing the olefin reaction is converted by contacting a mixture of two double bond isomers with an olefin reaction catalyst under conditions for obtaining the olefin reaction. The mixture of double bond isomers is provided either by selecting or blending a feed stock containing suitable olefins or by including a double bond isomerization step in the process. Good results are obtained when the mixture contains not more than about 97 percent of a single isomer.

The invention also is applicable when other isomers are present in the mixture and where olefins of different number of carbon atoms per molecule are present. Thus, the feed can consist of olefins of a single carbon number having different skeletal configurations and/or olefins of different number of carbon atoms per molecule as well as double bond isomers of at least one of the olefins present.

Further according to this invention, improved results are obtained in the olefin reaction by subjecting the olefins to a pretreatment by contacting with magnesium oxide.

Olefins applicable for use in the process of the invention include acyclic mono- and polyenes having at least 3 carbon atoms per molecule and cycloalkyl and aryl derivatives thereof; cyclic mono- and polyenes having at least 4 carbon atoms per molecule and alkyl and aryl derivatives thereof; mixtures of two or more of the above olefins; and mixtures of ethylene with one or more of the above olefins. Many useful reactions are accomplished with such acyclic olefins having 3 to 30 carbon atoms per molecule and with such cyclic olefins having 4 to 30 carbon atoms per molecule.

Some examples of olefin isomer mixtures suitable for the olefin reaction according to this invention include: 1-butene and 2-butene; 1-pentene, 2-pentene, 3-methylbutene-1, 2-methylbutene-1 and 2-methylbutene-2; 4-cycloheptylbutene-1, 4-cycloheptylbutene-2; 4-phenylpentene-1, 4-phenylpentene-2, 1-phenylpentene-2; 1-hexene, 3-hexene, 3-methyl-1-pentene, 3-methyl-2-pentene, and other hexene isomers; 1-heptene, 2-heptene, 3-heptene, 3,3-dimethylpentene-1, and other heptene isomers; 1-octene, 4-octene, 3-ethyl-4-methylpentene-1, and other octene isomers; 1-nonene, 3-nonene, 4-nonene, 4-ethyl-5-methylhexene-2, and other nonene isomers; 1-decene, 3-decene, 5-decene, 4,4-diethylhexene-1, and other decene isomers; 1-dodecene, 4-dodecene, 2-butyloctene-1, and other dodecene isomers; 2-pentadecene, 5-pentadecene, 6-pentyldecene-3, and other pentadecene isomers; 2-octadecene, 8,8-dipropyldodecene-4, and other octadecene isomers; 1-eicosene, 4-eicosene, 5-eicosene, 2,3,4,5-tetramethyl-6-propyltridecene-1, and other eicosene isomers; and the like, including mixtures of the above wherein olefins of a different number of carbon atoms per molecule are present.

The catalysts which are useful for the present invention are those which have activity for the disproportionation of propylene into ethylene and butenes. Some examples of such catalysts are (1) silica or thoria promoted by an oxide or a compound convertible to the oxide by calcination or sulfide of tungsten or molybdenum or by an oxide or a compound convertible to the oxide on calcination of rhenium or tellurium;

(2) alumina promoted with an oxide or compound convertible to an oxide by calcination of molybdenum, tungsten, or rhenium; a sulfide or tungsten or molybdenum; or an alklali metal salt, ammonium salt, alkaline earth metal salt, or bismuth salt of phosphomolybdic acid;

(3) one or more of the group aluminum phosphate, zirconium phosphate, calcium phosphate, magnesium phosphate, or titanium phosphate promoted by one or more of a sulfide of molybdenum or tungsten, or an oxide or a compound convertible to the oxide by calcination of molybdenum, tungsten or rhenium or magnesium tungstate or beryllium phosphotungstate; and (4) silica, alumina, aluminum phosphate, zirconium phosphate, calcium phosphate, magnesium phosphate, or titanium phosphate promoted by a hexacarbonyl of molybdenum or tungsten.

The catalysts of (1) can be prepared and activated by conventional techniques such as by combining a catalyst grade silica with suitable tungsten, molybdenum, rhenium or tellurium compounds by a conventional method such as, for example, impregnation, dry mixing, or coprecipitation. Suitable tungsten and molybdenum compounds include tungsten oxide and molybdenum oxide and compounds convertible to these oxides. The supported oxides are activated by calcining in air and the supported sulfides are activated by heating in an inert atmosphere.

The catalysts of (2) can be prepared and activated by conventional techniques such as by combining catalyst grade alumina with an oxide or a compound convertible to an oxide by calcination of molybdenum, tungsten or rhenium and calcining the resulting mixture after removal of any solvent used in the impregnation. The sulfides of tungsten or molybdenum or the salts of phosphomolybdic acid can be utilized to impregnate a catalyst grade alumina by solution in a proper solvent after which the solvent is evaporated and the resulting mixture dried to prepare the catalyst.

The catalyst compositions of (3) can be prepared and activated by conventional techniques. For example, molybdenum oxide can be coprecipitated with aluminum phosphate followed by calcination in air to produce an activated catalyst. Alternatively, the support material can be impregnated with a compound of the promoter convertible to the oxide, such as ammonium tungstate, followed by calcination in air. In the preparation of a sulfide-containing catalyst, a sulfide of the promoter can be ball-milled with a support, such as zirconium phosphate, followed by heating in an inert atmosphere such as nitrogen. Magnesium tungstate and beryllium phosphotungstate can be dry mixed with titanium phosphate, for example, and activated by calcination in the air at elevated temperatures.

The catalyst compositions of (4) can be prepared and activated by impregnating a previously calcined support material such as calcium phosphate with a solution of the hexacarbonyl of the promoter in an organic solvent such as benzene, followed by drying in a vacuum or in an inert atmosphere at about 50 to 700° F.

The catalytic agent is considered to be the reaction product resulting from the admixture of the support material and the promoter material which is subjected to activation treatment.

The operating temperature for the process of this invention when using catalysts of (1) is in the range of about 400 to 1100° F. The process of this invention when using the catalysts of (2) will be operated at a temperature in the range of about 150 to 500° F. The process using the catalysts of (3) will be carried out at a temperature of about 600 to 1200° F. The process using the catalysts of (4) will be carried out at a temperature of about 0 to 600° F. In the process of the invention, pressures are not important but will be in the range of about 0 to 2,000 p.s.i.g.

Other catalysts include those disclosed in Ser. No. 529,230, filed Feb. 23, 1966 (now abandoned); U.S. Pat. No. 3,261,879, issued July 19, 1966; U.S. Pat. No. 3,395,196, issued July 30, 1968; U.S. Pat. No. 3,418,390, issued Dec. 24, 1968; U.S. Pat. No. 3,442,969, issued May 6, 1969; and U.S. Pat. No. 3,444,262, issued May 13, 1969.

Preferred olefin feeds to the olefin reaction catalyst are those which contain substantial quantities of at least two of the possible double bond isomers of a particular olefin. Such a mixture can be obtained by blending appropriate feed streams or by using an isomerization step in the process. A feed stream of an olefin which consists predominantly of but one isomer can be isomerized to the desired mixture by preceding the olefin reaction step with a catalytic isomerization step. Alternatively, the isomerization step can be combined with the olefin reaction step by using a mixed catalyst bed. For example, a feed stream containing predominantly 1-butene can be contacted with a catalytic bed which consists of a mixture of a disproportionation catalyst such as an alumina supported cobalt molybdate and an isomerization catalyst.

A wide variety of isomerization catalysts can be used. Preferred catalysts are those which have little or no polymerization or cracking activity and which are active for isomerization at conditions suitable for obtaining an olefin reaction product with the selected olefin reaction catalyst. Some examples of suitable isomerization catalysts include magnesium oxide, phosphoric acid, bauxite, alumina supported cobalt oxide or iron oxide or manganese oxide, and the like. Suitable catalysts can be selected from among those available in the art, such as the double bond isomerization catalysts listed in H. N. Dunning "Review of Olefin Isomerization," Ind. & Eng. Chem. 45, 551 (March 1953).

When using magnesium oxide, the isomerization can be accomplished at temperatures ranging from about 50 to about 1100° F., preferably about 300 to about 900° F. at any suitable pressure and at residence times or throughput rates which will effect the desired degree of isomerization.

When using successive isomerization and olefin reaction steps, any conventional contacting technique can be used for the isomerization step. This includes fixed bed operation, fluidized bed operation, suspended catalyst system, and the like, depending upon which technique is most suitable for the olefin being converted and the operation in general. Either liquid phase or gas phase operation can be carried out. The isomerization stage can be relatively remote from or closely integrated with the disproportionation step.

Magnesia suitable for use in the invention can be any suitably activated material known in the art. The material normally has a surface area of at least 1 m.²/g. The magnesia can be naturally occurring, such as the mineral Brucite, or can be synthetically prepared by suitable techniques. Minor amounts of other materials such as silica, alumina, and the like, can be present, but the material is principally magnesium oxide. Depending upon the contacting technique used for the isomerization, the activated magnesia can be in the form of pellets, extrudates, agglomerates, or even a fine powder. Before use in the process, the magnesium oxide is activated in a suitable manner such as by heating in a flowing stream of an oxygen-containing gas for about 1 to about 30 hours at 500 to about 1500° F., preferably 600 to about 1000° F. After activation sometimes it is advisable to flush the catalyst with an inert gas to remove any adsorbed oxygen or other gases from the magnesium oxide. The regeneration of spent magnesium oxide isomerization catalyst is generally accomplished by a technique which is similar to the activation of this material.

The conversion can be carried out at any convenient pressure up to about 2000 p.s.i.g. or higher, preferably 0 to 500 p.s.i.g., and at weight hourly space velocities (WHSV) of about 0.1 to about 1000 w./w./hr.

In some instances it has been found that pretreatment of the olefin feed with activated magnesia at relatively low temperature is unexpectedly effective in improving the ease and efficiency of the subsequent olefin reaction.

The purity of a feed is an important factor in any chemical process in that it effects directly the efficiency or even operability of that process. Olefin reaction processes in general require the substantial absence of materials which cause difficulty as, for example, by poisoning of the catalyst. Some of these impurities, for example, oxygen and water, are known; others are unknown. Activated magnesia is greatly superior to many other absorption agents in the purification of feed streams for olefin reaction. Any suitably activated magnesia can be used for the pretreatment. For example, the magnesia as described above for use as isomerization catalysts can be used. It is not necessary that the pretreatment be under conditions of olefin isomerization. The benefits of the pretreatment can be obtained by contacting the feed with magnesium oxide at relatively low temperatures which may be as low as the freezing point of the olefin being treated and may be high as a point where significant isomerization activity is observed. Frequently, ambient temperatures such as room temperatures are satisfactory for an adequate pretreatment.

Any conventional contacting device can be used for the pretreatment. For example, the olefin can be treated by passing through a fixed or fluidized bed of activated magnesia or contact can be made by suspending the magnesia, by suitable agitation in the vessel containing the olefin to be treated. The contact with the magnesia can be either in vapor or liquid phase depending upon the nature of the olefin to be treated. The time of contact, throughput rate in regard to a fixed bed of magnesia, or magnesia usage per unit weight olefin, varies greatly with the olefin being treated and the degree of treatment which may be required to bring the olefin into condition for reaction. Because the nature of the impurities removed is not always known, the optimum extent of treatment often can best be determined by trial and error.

Such an olefin pretreatment with magesia at relatively low temperatures is advantageous even though magnesia may be present at a point downstream of the process, for example, where its isomerization activity is being exploited at somewhat higher temperatures.

Often in its use as an olefin treating agent, magnesium oxide slowly becomes discolored and deactivated. It can be regenerated using techniques similar to those of its original activation.

Where desirable, magnesium oxide can be used in conjunction with other known adsorptive materials in the pretreatment step. For example, magnesium oxide can be used either consecutively or in mixture with alumina, silica gel, molecular sieve type materials, adsorptive clays, and the like. When used in mixture, the regeneration procedure should be selected to be compatible with all components of the treating mixture. In some instances, different regeneration techniques can be used, for example, treatment with polar solvents or by first segregating mechanically and isolating any temperature sensitive component for separate treatment.

As indicated above, the specific reasons why olefin pretreatment with magnesia is extremely beneficial in some instances is not known with certainty. However, it is believed that the olefin reaction process may be sensitive to such contaminants as peroxides and hydroperoxide compounds in very low concentration and that magnesia is particularly effective in the removal of these and other impurities from olefins.

The invention is further illustrated by the following examples:

EXAMPLE I

Butene-1, butene-2, and several mixtures of these two olefins were disproportionated over a disproportionation catalyst which contained 85.6 weight percent alumina, 3.4 weight percent cobalt oxide, and 11.0 weight percent molybdenum oxide. Before use, the catalyst was activated for five hours in a stream of dry, fluidizing air. After the activation period, the catalyst was cooled in a stream of flowing nitrogen and was maintained in that atmosphere until use in the disproportionation step. The disproportionation reaction was carried out in a fixed bed reactor at 0 p.s.i.g., 330° F., and at a gaseous hourly space velocity of 1000 v./v./hr.

In the runs carried out using a mixture of the two olefins, the desired blend was prepared by feeding a premixed blend of olefins into the reactor. After a given feed was on the stream for 20 minutes (with the exception of the essentially pure 2-butene feed which was on stream for only 15 minutes), the reactor effluent was sampled for analysis. A fresh charge of catalyst was used for testing each variation of feed stream. The results of the test are shown in the table below.

| Feed composition, weight percent: | | | | | |
|---|---|---|---|---|---|
| 1-butene | 0.6 | 24.8 | 51.0 | 75.5 | 97.5 |
| 2-butene | 99.4 | 75.2 | 49.0 | 24.5 | 2.5 |
| Product composition, weight percent: | | | | | |
| Ethylene | 0.1 | 0.2 | 0.6 | 1.1 | 1.6 |
| Propylene | 6.2 | 10.3 | 10.2 | 7.4 | 3.6 |
| 1-butene | 1.2 | 7.0 | 21.6 | 40.3 | 58.1 |
| trans-2-butene | 54.0 | 39.4 | 27.0 | 16.4 | 9.1 |
| cis-2-butene | 27.2 | 24.7 | 21.1 | 17.2 | 15.2 |
| 1-pentene | 0.1 | 0.2 | 0.2 | 0.4 | 0.4 |
| trans-2-pentene | 6.1 | 10.1 | 9.9 | 7.3 | 3.6 |
| cis-2-pentene | 2.8 | 4.7 | 5.6 | 4.5 | 2.1 |
| C₆+ | 2.3 | 3.4 | 3.8 | 5.4 | 6.3 |
| Percent conversion | 17.6 | 28.9 | 30.4 | 26.1 | 17.6 |

Examination of the above table will show that the disproportionation runs utilizing mixtures of the alpha and betal olefins resulted in a greater conversion than the runs utilizing the essentially pure individual isomers.

EXAMPLE II

An alumina-supported cobalt molybdate catalyst (identical to that used in Example I) was activated for two hours at 1100° F. in flowing air. A quantity of this catalyst was used as a catalytic bed in a stainless steel reactor. The particle size of the catalyst was 20–40 mesh.

Pentenes and their mixtures were tested in a series of 30 minute runs. These were carried out at 250° F., 0 p.s.i.g. and at 6 liquid hourly space velocity (or 5.8

WHSV). The effluents were analyzed and the results are seen in the following table.

| Feed, percent: | | | |
|---|---|---|---|
| 1-Pentene | 0 | 51 | 100 |
| 2-Pentene | 100 | 49 | 0 |
| Products, weight percent: | | | |
| Ethylene | | 1.5 | 15.4 |
| Propylene | 1.4 | 21.0 | 18.7 |
| Butenes | 64.5 | 60.1 | 40.6 |
| C₆+ | 26.3 | 17.4 | 25.3 |
| n-Pentane | 7.8 | | |
| Butene fraction; percent 1-butene* | 4 | 73 | 85 |
| Pentene conversion, percent | 40.6 | 47.2 | 18.2 |

*Includes isobutene, if any.

The data indicate that the mixture of pentene isomers is more readily disproportionated than the individual isomers.

EXAMPLE III

Table I below shows a comparison of the reaction time and product distribution in two runs in which octene-4 was disproportionated. These runs were carried out at atmospheric pressure by refluxing the octene-4 contained in a distillation pot into a reaction tube containing a disproportionation catalyst. In one run, the catalytic chamber contained only an olefin disproportionation catalyst (a molybdenum oxide on alumina catalyst which had been treated with about 0.5 weight percent KOH). In the other runs, the catalytic tube contained first a bed of magnesium oxide granules and, adjacent to it, a bed of the olefin disproportionation catalyst. The molybdena/alumina and magnesia had a particle size of about 30–50 mesh.

In each of these runs, the octene-4 was refluxed for a period of time after which the pot temperature was noted, the composition of the reaction mixture was determined, and the degree of conversion of octene-4 was computed. The results of these two runs are shown in the table below.

TABLE I.—DISPROPORTIONATION OF OCTENE-4 IN ATMOSPHERIC REFLUX SYSTEM

| | | | | |
|---|---|---|---|---|
| Al₂O₃-MoO₃ (0.5 weight percent KOH), grams | 14.4 | | 10.4 | |
| MgO, grams | | | 3.7 | |

| | Pot temperature, °C., reached in minutes | | | |
|---|---|---|---|---|
| | 130.5° C./177 min. | | 146° C./177 min. | |
| | Weight percent | Mol percent | Weight percent | Mol percent |
| C₂ | | | 0.012 | 0.043 |
| C₃ | | | 0.550 | 1.400 |
| C₄ | 0.19 | 0.40 | 2.030 | 3.880 |
| C₅ | 0.69 | 1.15 | 3.400 | 5.200 |
| C₆ | 2.28 | 3.16 | 7.520 | 9.580 |
| C₇ | 9.40 | 11.15 | 19.580 | 21.400 |
| C₈ | 43.40 | 45.10 | 28.780 | 27.500 |
| C₉ | 28.60 | 26.40 | 24.750 | 21.000 |
| C₁₀ | 12.08 | 10.03 | 10.080 | 7.700 |
| C₁₁ | 2.90 | 2.19 | 2.720 | 1.895 |
| C₁₂ | 0.45 | 0.31 | 0.585 | 0.374 |
| Conversion, percent | 56.6 | 56.6 | 71.2 | 71.2 |

It was necessary to decrease the amount of the molybdena/alumina catalyst in the second test in order to include the magnesium oxide catalyst in the reaction tube. However, in spite of the smaller amount of disproportionation catalyst, this reaction was still much faster than the one which contained no magnesium oxide. Under the conditions of the runs, the temperature in the chamber was about 120° C. and, therefore, somewhat lower than the temperature needed to obtain optimum double bond isomerization over the magnesium oxide catalyst. Applying some pressure to this reactor system could have achieved a higher temperature in this catalytic zone. However, despite this handicap, the value of the magnesium oxide in the olefin disproportionation system is clearly shown both in the degree of conversion attained in the period of time, and in the number of and distribution of new olefin products.

EXAMPLE IV

Pentene-1 containing an unknown contaminant or contaminant detrimental to disproportionation was disproportionated in a run demonstrating the effectiveness of magnesium oxide pretreatment at relatively low temperatures and improving the conversion level. The run was carried out using a commercial pentene-1 having a purity greater than 99.0 percent in a continuous reactor at 100 p.s.i.g. and 537 WHSV by passing the feed sequentially through a bed consisting of 10 parts by weight of granular magnesium oxide and a bed consisting of a mixture of 14 parts by weight of granular magnesium oxide and 2 parts by weight of granular tungsten oxide supported on silica. These adjacent beds were maintained at 775° F. during the run. During the initial part of the run, the feed was pretreated by passing through a bed consisting of 50 parts by weight of granular magnesium oxide preceded by 10 parts by weight of granular silica gel at ambient temperatures. During the latter part of the run, the pretreatment was omitted. The results are set forth in the table below.

Time on stream (minutes):  Conversion (percent)
5 _____ 73.5
12 _____ 71.9
19 _____ 72.5
26 _____ 72.5
33 _____ 71.2

At this point, the pretreatment was discontinued.

Time on stream (minutes):  Conversion (percent)
38 _____ 75.4
44 _____ 67.8
53 _____ 16.1
63 _____ 0.5
75 _____ 0.4

EXAMPLE V

Linear heptenes (a mixture of heptene-2 and heptene-3) were disproportionated by passage through a tubular stainless steel reactor containing a bed of tungsten oxide on silica catalyst. The catalyst was activated in flowing air for 2 hours at 1100° F., flushed with nitrogen, treated with carbon monoxide for 30 minutes, then again flushed with nitrogen and cooled.

The mixed heptenes were prepared for disproportionation by a pretreatment which consisted of a consecutive percolation at room temperature through a bed of mixed alumina and mol sieve 10X granules, through a bed of silica gel granules, and finally through a bed of magnesia granules. The magnesia had been activated for about 3 hours in flowing air. 25 parts by weight of magnesia was used to treat about 6000 parts by weight of heptene feed. The magnesia bed became discolored during the pretreatment whereas the bed of silica gel appeared unchanged.

For comparison, the same heptenes mixture was also disproportionated under essentially identical conditions except that magnesia was not present in the purification train. The olefin feed was pretreated by percolation through the bed of mixed alumina and mol sieve 10X, and then through a bed of alumina alone. The essential data and results of these tests are shown in the table below:

| Magnesia | Used | Not used |
|---|---|---|
| Temperature, °F | 805 | 800 |
| Pressure, p.s.i.g. | 300 | 300 |
| Rate, WHSV | 30 | 30 |
| Conversion, percent | 72.1 | 1–2 |

The data in the table clearly show the effectiveness of olefin pretreatment with magnesia in the disproportionation process.

Reasonable variation and modification are possible within the scope of the invention which sets forth a method for the olefin reaction.

What is claimed is:

1. A method for converting an olefin hydrocarbon having at least 3 carbon atoms per molecule and capable of undergoing the olefin reaction which comprises contacting said olefin with activated magnesium oxide at a temperature at which substantially no double bond isomerization occurs, and contacting the effluent from the contacting with magnesium oxide with a catalyst which has activity for the disproportionation of propylene into ethylene and butene under conditions including conditions of temperature, pressure and contact time suitable for obtaining a product of the olefin reaction which, as defined herein, can be visualized as comprising the reaction between two first pairs of carbon atoms, the two carbon atoms of each first pair being connected by an olefinic double bond, to form two new pairs from the carbon atoms of said first pairs, the two carbon atoms of each of said new pairs being connected by an olefinic double bond.

2. The method of claim 1 wherein said olefin hydrocarbon capable of undergoing the olefin is propylene and including an isomerization step combined with the olefin reaction step using a mixed catalyst bed.

3. The method of claim 1 wherein said olefin hydrocarbon capable of undergoing the olefin reaction has at least 4 carbon atoms per molecule and including an isomerization step either by preceding the olefin reaction step with a catalytic isomerization step or by combining an isomerization step with the olefin reaction step by using a mixed catalyst bed.

4. The method of claim 2 wherein said isomerization is accomplished by contacting with magnesium oxide under isomerization conditions.

5. The method of claim 3 wherein said isomerization is accomplished by contacting with magnesium oxide under isomerization conditions.

References Cited
UNITED STATES PATENTS

| | | | |
|---|---|---|---|
| 2,361,613 | 10/1944 | Drennan | 260—683.2 |
| 2,406,112 | 8/1946 | Schulze | 260—680 |
| 3,261,879 | 7/1966 | Banks | 260—683 |

DELBERT E. GANTZ, Primary Examiner

C. E. SPRESSER, JR., Assistant Examiner

U.S. Cl. X.R.

260—666 A, 668, 669, 677, 680, 683.2